Patented Apr. 1, 1924.

1,489,160

UNITED STATES PATENT OFFICE.

AUGUST HEINRICH SCHOBEL, OF BASEL, SWITZERLAND, ASSIGNOR TO SOCIETY OF CHEMICAL INDUSTRY IN BASLE, OF BASEL, SWITZERLAND.

AZO DYESTUFF DERIVED FROM PYRAZOLONE AND PROCESS OF MAKING THE SAME.

No Drawing.  Application filed November 5, 1923.  Serial No. 673,000.

*To all whom it may concern:*

Be it known that I, AUGUST HEINRICH SCHOBEL, a citizen of the Swiss Republic, and residing at Basel, Switzerland, have invented a new and useful Azo Dyestuff Derived from Pyrazolone and Processes of Making the Same, of which the following is a full, clear, and exact specification.

This invention relates to a new and valuable dyestuff for printing on cotton. The invention comprises the dyestuff itself as well as the manufacture of the same, and the material printed with the new dyestuff.

I have found that a new and valuable azo-dyestuff derived from pyrazolone may be obtained by combining the diazo-derivative of the 2-amino-1-phenol-4-sulfo-6-carboxylic acid with the 1-(3'-carboxy)-phenyl-5-pyrazolone-3-carboxylic acid.

The new dyestuff corresponds with the formula:

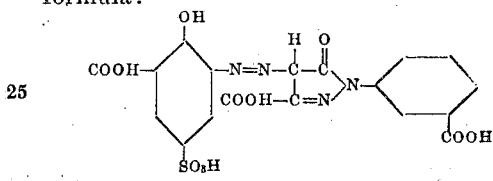

and forms a reddish-brown powder dissolving in water with orange color, becoming yellow on addition of caustic soda. It dissolves in concentrated sulfuric acid to a yellow solution and printed on cotton by means of chromium mordants, it yields very bright and fast red orange tints.

*Example.*

23.3 parts of 2-amino-1-phenol-4-sulfo-6-carboxylic acid are diazotized in the usual manner and introduced into an aqueous solution containing 29.6 parts of the disodium salt of the 1-(3'-carboxy)-phenyl-5-pyrazolone-3-carboxylic acid and an excess of sodium carbonate. The dyestuff thus obtained is thrown out by means of common salt.

What I claim is:

1. As a new product the herein described new azo-dyestuff derived from pyrazolone which corresponds with the formula:

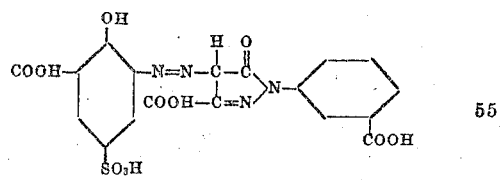

forming a reddish-brown powder which dissolves in water with orange color, becoming yellow on addition of caustic soda, dissolving in concentrated sulfuric acid to a yellow solution, and yielding, printed on cotton by means of chromium mordants, very bright and fast red orange tints.

2. Material printed with the azo-dyestuff of claim 1.

In witness whereof I have hereunto signed my name this 24th day of October, 1923, in the presence of two subscribing witnesses.

AUGUST HEINRICH SCHOBEL.

Witnesses:
  AMAND BRAUN,
  LUCIEN BICARD.